United States Patent [19]

Ohishi

[11] Patent Number: 5,659,577
[45] Date of Patent: Aug. 19, 1997

[54] APPARATUS FOR GENERATING A DIGITAL RECORDING SIGNAL WHICH AVOIDS THE GENERATION OF FALSE SYNCHRONIZATION BIT PATTERNS

[75] Inventor: Takeo Ohishi, Yokohama, Japan

[73] Assignee: Victor Company of Japan, Ltd., Yokohama, Japan

[21] Appl. No.: 393,906

[22] Filed: Feb. 24, 1995

[30] Foreign Application Priority Data

Jun. 29, 1994 [JP] Japan .................................. 6-170214

[51] Int. Cl.$^6$ .......................... H04B 14/04; H03M 7/00; G11B 20/10
[52] U.S. Cl. ........................... 375/242; 375/365; 360/40; 341/61; 341/95
[58] Field of Search .................................. 375/242, 377, 375/365, 246, 253, 290, 291; 341/61, 95; 360/40

[56] References Cited

U.S. PATENT DOCUMENTS

| 4,512,026 | 4/1985 | Vander Meiden | 375/365 |
| 4,541,104 | 9/1985 | Hirosaki | 375/365 |
| 4,775,985 | 10/1988 | Busby | 375/242 |
| 5,016,258 | 5/1991 | Tanaka et al. | 375/242 |
| 5,140,474 | 8/1992 | Kahlman et al. | 360/40 |
| 5,142,421 | 8/1992 | Kahlman et al. | 360/40 |

*Primary Examiner*—Stephen Chin
*Assistant Examiner*—Jeffrey W. Gluck
*Attorney, Agent, or Firm*—Pollock, Vande Sande & Priddy

[57] ABSTRACT

In a digital information modulating apparatus, first information signal is separated every m bit or bits, and n bit or bits are added to the head of every m bit or bits to change every m bit or bits of the first information signal into every m+n bits of a second information signal, where "m" and "n" denote predetermined natural numbers. The second information is pre-coded into plural pre-coded information signals in accordance with combinations of the added n bit or bits. A determination is made as to whether or not predetermined sync information is present in the pre-coded information signals. A sync detection signal is generated which represents the result of the determination. One of the pre-coded information signals is selected as a modulation-resultant output signal in response to the sync detection signal.

3 Claims, 7 Drawing Sheets

APPARATUS FOR GENERATING A DIGITAL RECORDING SIGNAL WHICH AVOIDS THE GENERATION OF FALSE SYNCHRONIZATION BIT PATTERNS

BACKGROUND OF THE INVENTION

1. Field of the Invention

This invention relates to a digital information modulating apparatus usable in various systems such as a system for recording a digital information signal or a digital video signal on a recording medium.

2. Description of the Prior Art

A known method of digital modulation for a digital VTR (video tape recorder) executes 24-25 conversion to enable the generation of prior signals for tracking. In the 24-25 conversion, a bit sequence representing information to be recorded is separated into groups each having 24 successive bits, and one bit is added to the head of every group. The conversion-resultant bit sequence is recorded on a magnetic tape after being subjected to NRZI encoding for recording.

The added bits are set to "1" or "0" in a manner such that the difference between the number of bits of "1" and the number of bits of "0" in each given length of the conversion-resultant bit sequence, that is, the digital sum variation (DSV), will periodically change to generate two pilot signals having different preset frequencies $\omega_1$ and $\omega_2$.

There are provided three different types F0, F1, and F2 of recording tracks on the magnetic tape for the pilot signals. An F0-type recording track is designed to generate no pilot signals. An F1-type recording track is designed to generate the pilot signal having the preset frequency $\omega_1$. An F2-type recording track is designed to generate the pilot signal having the preset frequency $\omega_2$.

On the magnetic tape, recording tracks of the different types are arranged as F0, F1, F0, F2, F0, . . . . Specifically, F1-type recording tracks and F2-type recording tracks are alternately present between F0-type recording tracks.

While a magnetic head scans an F0-type recording track, tracking control is executed so that the magnitudes of pilot signals leaked from neighboring tracks will be substantially equal. To enable easy detection of leaked pilot signals, an F0-type recording track is designed to correspond to a frequency spectrum having notches at the preset frequencies $\omega_1$ and $\omega_2$.

SUMMARY OF THE INVENTION

It is an object of this invention to provide an improved digital information modulating apparatus.

A first aspect of this Invention provides a digital information modulating apparatus comprising means for separating first information every m bit or bits; means for adding n bit or bits to a head of said every m bit or bits to change said every m bit or bits of the first information into every m+n bits of second information, where "m" and "n" denote predetermined natural numbers; means for pre-coding the second information into plural pre-coded information signals in accordance with combinations of the added n bit or bits; means for detecting whether or not predetermined sync information is present in the pre-coded information signals, and generating a sync detection signal representative thereof; and means for selecting one of the pre-coded information signals as a modulation-resultant output signal in response to the sync detection signal.

A second aspect of this invention provides a digital information modulating apparatus comprising means for separating first information signal every m bit or bits; means for adding n bit or bits to a head of said every m bit or bits to change said every m bit or bits of the first information signal into every m+n bits of a second information signal, where "m" and "n" denote predetermined natural numbers; means for pre-coding the second information into plural pre-coded information signals in accordance with combinations of the added n bit or bits; means for detecting whether or not predetermined sync information is present in the pre-coded information signals, and generating a sync detection signal representative thereof; means for detecting errors between frequency conditions of the pre-coded information signals and a predetermined frequency condition, and generating an error signal representative thereof; and means for selecting one of the pre-coded information signals as a modulation-resultant output signal in response to the sync detection signal and the error signal.

A third aspect of this invention provides a digital information modulating apparatus comprising means for periodically adding a bit in a logic state of "0" to a first bit sequence to convert the first bit sequence into a second bit sequence, the first bit sequence representing information to be subjected to modulation; means for periodically adding a bit in a logic state of "1" to the first bit sequence to convert the first bit sequence into a third bit sequence; means for converting the second bit sequence into a fourth bit sequence; means for converting the third bit sequence into a fifth bit sequence; means for detecting whether or not successive bits having a predetermined sync bit pattern are present in the fourth bit sequence, and generating a first detection signal representative thereof; means for detecting whether or not successive bits having the predetermined sync bit pattern are present in the fifth bit sequence, and generating a second detection signal representative thereof; and means for selecting one of the fourth bit sequence and the fifth bit sequence as a modulation-resultant bit sequence in response to the first and second detection signals to prevent the modulation-resultant bit sequence from containing successive bits having the predetermined sync bit pattern.

DESCRIPTION OF THE PREFERRED EMBODIMENT

Before a detailed description of this invention, a background-art modulating apparatus will be described for a better understanding of this invention.

Figure 1:
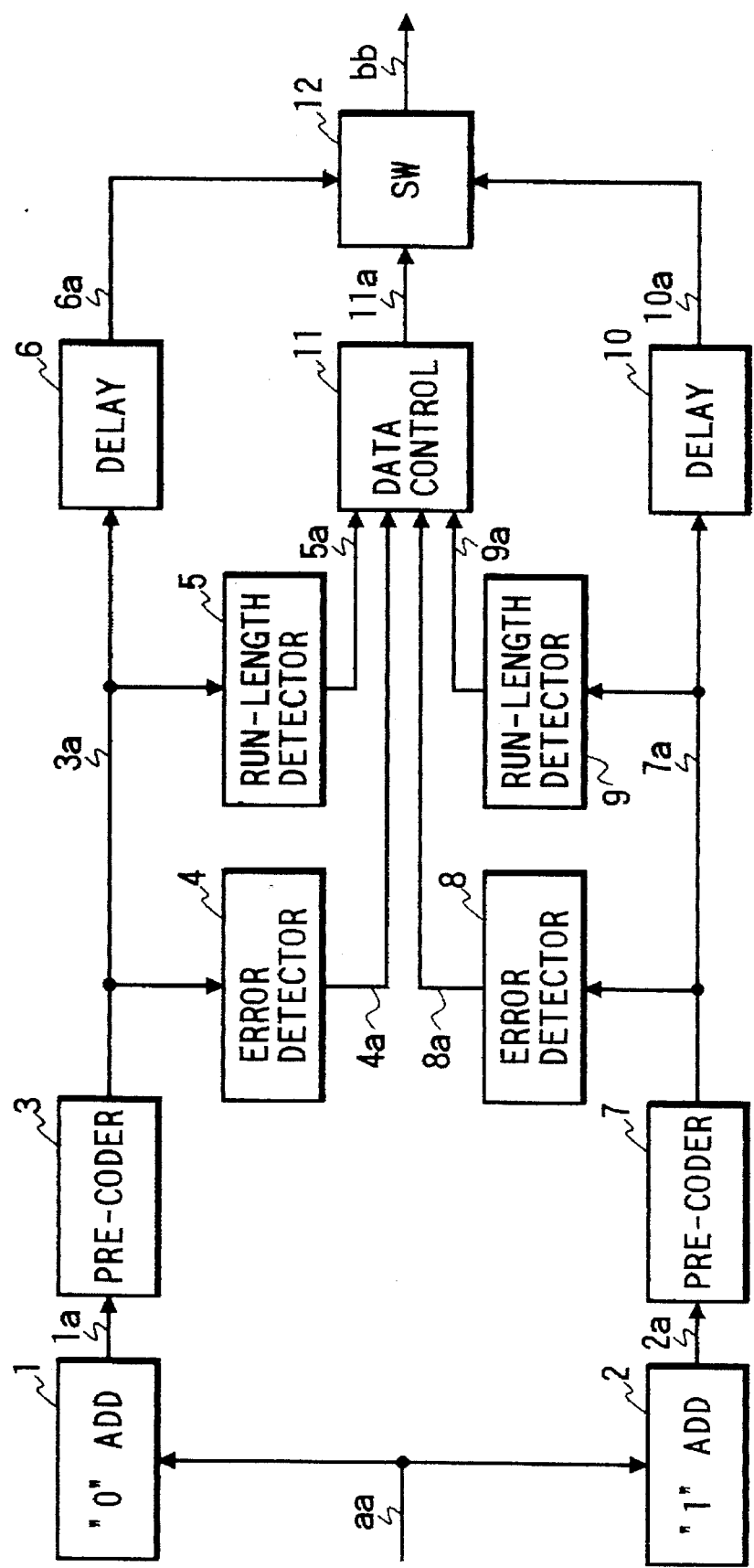
FIG. 1 is a block diagram of a background-art modulating apparatus.

FIG. 1 shows a background-art modulating apparatus. As shown in FIG. 1, the background-art modulating apparatus includes a "0" adding device 1 and a "1" adding device 2 to which an input information signal "aa" is fed. The input information signal "aa" has a sequence of bits.

Figure 2:
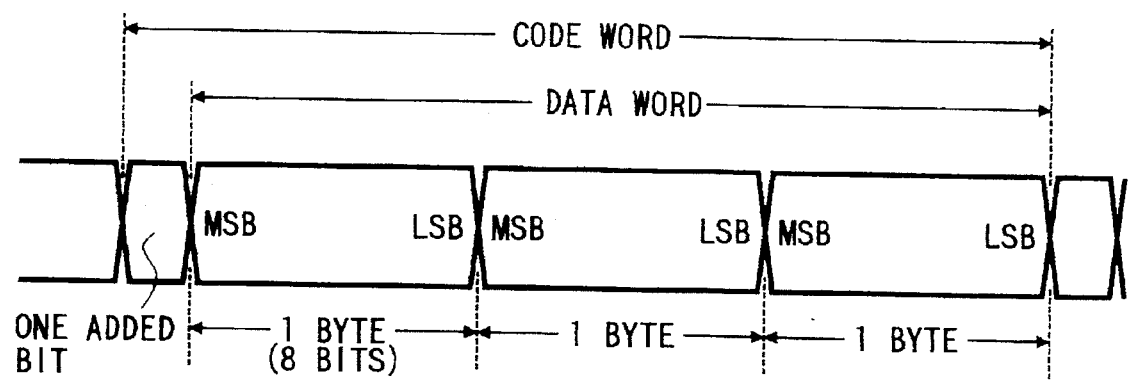
FIG. 2 is a diagram of the format of an information signal which results from 24-25 conversion.

The "0" adding device 1 and the "1" adding device 2 handle the input information signal "aa" 8 bits by 8 bits, that is, one byte by one byte. The "0" adding device 1 and the "1" adding device 2 execute the following 24-25 conversions of the input information signal "aa". As shown in FIG. 2, every successive three bytes of the input information signal "aa" comprise one data word. The "0" adding device 1 adds a bit of "0" to the head of every data word, and thereby encodes the data word into a code word. In this way, the "0" adding device 1 encodes the input information signal "aa" into a coded information signal 1a. On the other hand, the "1" adding device 2 adds a bit of "1" to the head of every data word, and thereby encodes the data word into a code word. In this way, the "1" adding device 2 encodes the input information signal "aa" into a coded information signal 2a.

In the background-art modulating apparatus of FIG. 1, a pre-coder 3 receives the information signal 1a from the "0" adding device 1. This device 3 converts the information signal 1a into a pre-coded information signal 3a. A delay device 6 receives the pre-coded information signal 3a from the pre-coder 3. The delay device 6 delays the pre-coded information signal 3a, and thereby converts the pre-coded information signal 3a into a delay-resultant pre-coded information signal 6a for timing adjustment. The delay device 6 outputs the delay-resultant pre-coded information signal 6a to a switch 12.

In the background-art modulating apparatus of FIG. 1, a pre-coder 7 receives the information signal 2a from the "1" adding device 2. This device 7 converts the information signal 2a into a pre-coded information signal 7a. A delay device 10 receives the pre-coded information signal 7a from the pre-coder 7. The delay device 10 delays the pre-coded information signal 7a, and thereby converts the pre-coded information signal 7a into a delay-resultant pre-coded information signal 10a for timing adjustment. The delay device 10 outputs the delay-resultant pre-coded information signal 10a to the switch 12.

In the background-art modulating apparatus of FIG. 1, an error detector 4 receives the pre-coded information signal 3a from the pre-coder 3. The error detector 4 detects the frequency condition (the frequency spectrum) of the pre-coded information signal 3a, and compares the detected frequency condition of the pre-coded information signal 3a with a desired frequency condition (a desired frequency spectrum). The error detector 4 generates an error signal 4a representing the difference (the error) between the detected frequency condition and the desired frequency condition. The error detector 4 outputs the error signal 4a to a data controller 11.

In addition, a run-length detector 5 receives the pre-coded information signal 3a from the pre-coder 3. The run-length detector 5 generates a run-length detection signal 5a from the pre-coded information signal 3a. The run-length detection signal 5a represents the number of successive bits of a same logic state (that is, a run length) in the pre-coded information signal 3a. The run-length detector 5 outputs the run-length detection signal 5a to the data controller 11.

In the background-art modulating apparatus of FIG. 1, an error detector 8 receives the pre-coded information signal 7a from the pre-coder 7. The error detector 8 detects the frequency condition (the frequency spectrum) of the pre-coded information signal 7a, and compares the detected frequency condition of the pre-coded information signal 7a with a desired frequency condition (a desired frequency spectrum). The error detector 8 generates an error signal 8a representing the difference (the error) between the detected frequency condition and the desired frequency condition. The error detector 8 outputs the error signal 8a to the data controller 11.

In addition, a run-length detector 9 receives the pre-coded information signal 7a from the pre-coder 7. The run-length detector 9 generates a run-length detection signal 9a from the pre-coded information signal 7a. The run-length detection signal 9a represents the number of successive bits of a same logic state (that is, a run length) in the pre-coded information signal 7a. The run-length detector 9 outputs the run-length detection signal 9a to the data controller 11.

The data controller 11 generates a control signal 11a in response to the error signals 4a and 8a and the run-length detection signals 5a and 9a. The data controller 11 outputs the generated control signal 11a to the switch 12. The switch 12 selects one of the delay-resultant pre-coded information signals 6a and 10a in response to the control signal 11a, and transmits the selected signal as an output information signal or a modulation-resultant information signal "bb".

The data controller 11 includes, for example, a signal processor or a microcomputer programmed to execute the following functions. In the case where one of the run lengths represented by the run-length detection signals 5a and 9a exceeds a threshold value, the data controller 11 sets the control signal 11a to a state enabling the switch 12 to select one of the delay-resultant pre-coded information signals 6a and 10a which is unrelated to the excess over the threshold value. In the case where both the run lengths represented by the run-length detection signals 5a and 9a exceed the threshold value and where the run lengths are different from each other, the data controller 11 sets the control signal 11a to a state enabling the switch 12 to select one of the delay-resultant pre-coded information signals 6a and 10a which is related to the smaller run-length. In the case where both the run lengths represented by the run-length detection signals 5a and 9a exceed the threshold value and where the run lengths are equal to each other, the data controller 11 compares the errors represented by the error signals 4a and 8a and sets the control signal 11a to a state enabling the switch 12 to select one of the delay-resultant pre-coded information signals 6a and 10a which is related to the smaller error. In the case where both the run lengths represented by the run-length detection signals 5a and 9a do not exceed the threshold value, the data controller 11 compares the errors represented by the error signals 4a and 8a and sets the control signal 11a to a state enabling the switch 12 to select one of the delay-resultant pre-coded information signals 6a and 10a which is related to the smaller error.

Figure 3:
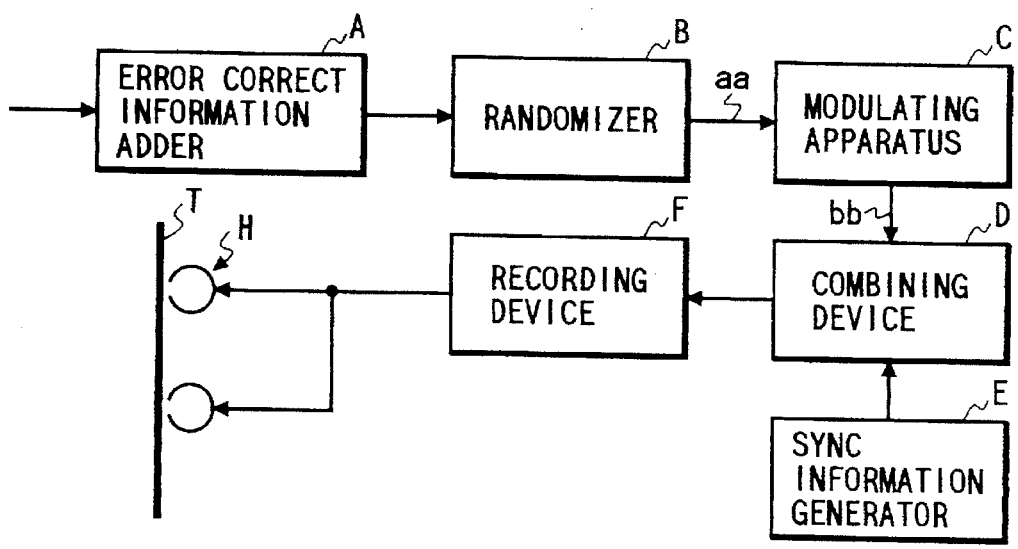
FIG. 3 is a block diagram of a digital VTR (video tape recorder).

FIG. 3 shows a digital VTR (video tape recorder) containing the background-art modulating apparatus of FIG. 1. The digital VTR of FIG. 3 includes an error correcting information adder "A" to which a digital video information signal is fed. The device "A" adds an error correcting information signal CRC to the digital video information signal, and outputs the resultant information signal to a randomizer "B". The randomizer "B" executes binary addition between the output signal of the error correcting information adder "A" and a maximum length code signal (a maximum length sequence signal), and outputs the resultant information signal "aa" to a modulating apparatus "C" equal to the background-art modulating apparatus of FIG. 1. The modulating apparatus "C" converts the output information signal "aa" of the randomizer "B" into a modulation-resultant information signal "bb". The modulating apparatus "C" outputs the modulation-resultant information signal "bb" to a combining device "D". A sync information generator "E" feeds the combining device "D" with a signal SYNC having a predetermined bit pattern representing sync information. The combining device "D" combines the modulation-resultant information signal "bb" from the modulating apparatus "C" and the sync information signal SYNC, and outputs the resultant information signal to a recording device "F". The recording device "F" amplifies the output information signal of the combining device "D", and outputs the amplified information signal to a magnetic head "H". The magnetic head "H" records the output information signal of the recording device "F" on a magnetic tape "T". Specifically, the output information signal of the recording device "F" is sequentially recorded on tracks inclined with respect to a longitudinal direction of the magnetic tape "T".

Figure 4:
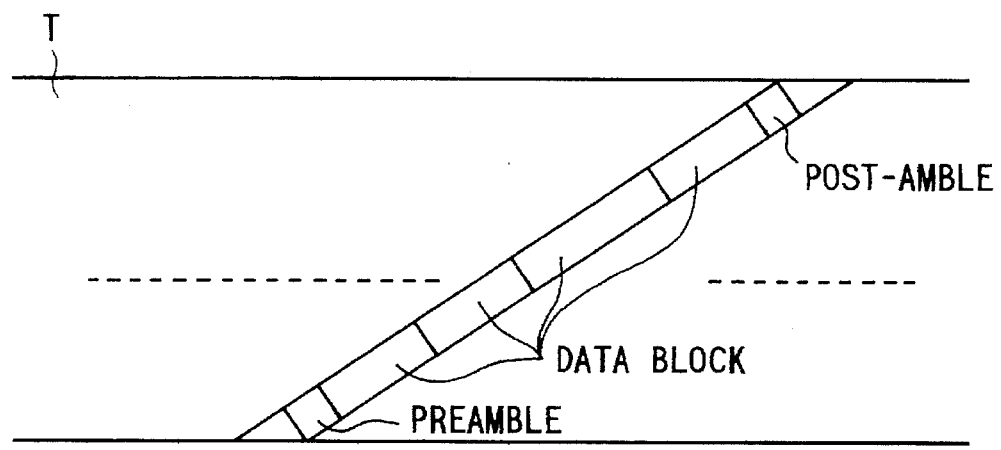
FIG. 4 is a diagram of an information signal segment recorded on one track of a magnetic tape.
Figure 5:
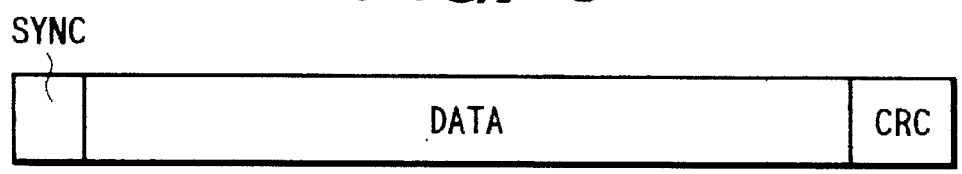
FIG. 5 is a diagram of the format of one data block.

As shown in FIG. 4, an information signal segment recorded on one track of the magnetic tape T has a sequence of a preamble, plural data blocks, and a post-amble. As shown in FIG. 5, every data block has a sequence of a sync information signal SYNC, video information data, and an error correcting information signal CRC.

During the reproduction of an information signal from the magnetic tape T, every sync information signal SYNC in the reproduced information signal is detected by referring to the predetermined bit pattern specified for the sync information (the sync bit pattern). In the case where an information signal is reproduced from the magnetic tape T at a tape speed equal to the tape speed which occurs during the recording of the information signal, a true sync information signal SYNC iteratively occurs in the reproduced information signal at a fixed period. The phase of every detected sync information signal is sensed, and a sync information signal which occurs at a given timing is recognized as being true while a sync information signal which occurs at a timing different from the given timing is recognized as being false. False sync information signals are disregarded. Accordingly, in the case where the information signal is reproduced from the magnetic tap T at a tape speed equal to the recording tape speed, a segment of the reproduced information signal which Is not the true sync information signal but which has a bit pattern equal to the sync bit pattern is prevented from being recognized as a true sync information signal SYNC.

On the other hand, in the case where an information signal is reproduced from the magnetic tape T at a speed different from the tape speed which occurs during the recording of the information signal, the head H moves along a direction inclined with respect to the recording tracks and thus travels across the recording tracks so that a true sync information signal SYNC tends to iteratively occur in the reproduced information signal at an irregular period. Accordingly, in this case, it is difficult to execute accurate discrimination between a true sync information signal and a false sync information signal by referring to the phase of a detected sync information signal. Thus, a segment of the reproduced information signal which is not the true sync information signal but which has a bit pattern equal to the sync bit pattern tends to be recognized as a true sync information signal SYNC.

As will be made clear later, this invention is designed to avoid this problem. This invention will be described in detail hereinafter.

Embodiment

Figure 6:
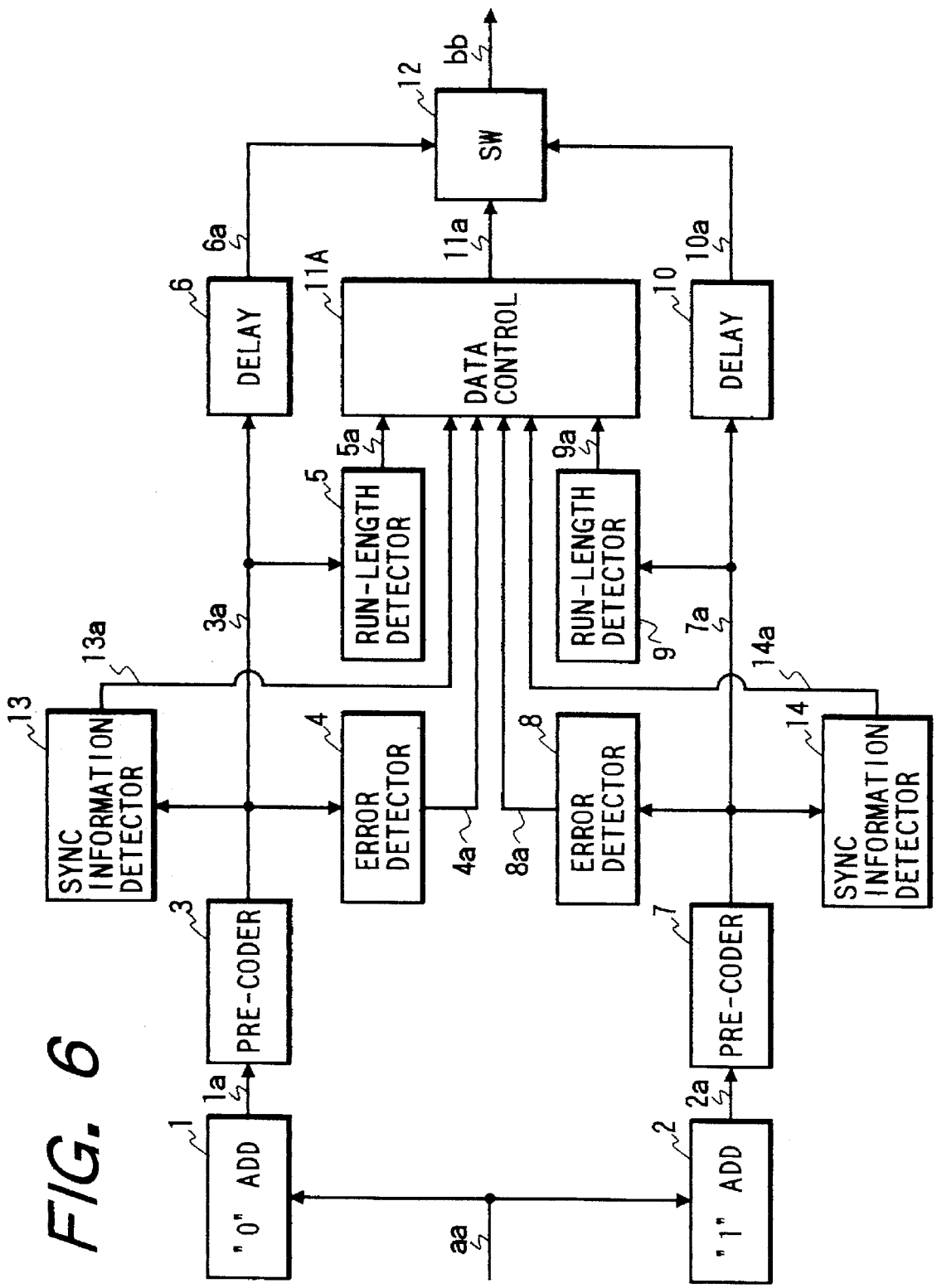
FIG. 6 is a block diagram of a digital information modulating apparatus according to an embodiment of this invention.

FIG. 6 shows a digital information modulating apparatus according to an embodiment of this invention. The digital information modulating apparatus of FIG. 6 includes a "0" adding device 1 and a "1" adding device 2 to which an input information signal "aa" is fed. The input information signal "aa" has a sequence of data bits.

The "0" adding device 1 and the "1" adding device 2 handle the input information signal "aa" 8 bits by 8 bits, that is, one byte by one byte. The "0" adding device 1 and the "1" adding device 2 execute the following 24-25 conversions. As shown in FIG. 2, every Successive three bytes of the input information signal "aa" compose one data word. The "0" adding device 1 adds a bit of "0" to the head of every data word, and thereby encodes the data word into a code word. In this way, the "0" adding device 1 encodes the input information signal "aa" into a coded information signal 1a. On the other hand, the "1" adding device 2 adds a bit of "1" to the head of every data word, and thereby encodes the data word into a code word. In this way, the "1" adding device 2 encodes the input information signal "aa" into a coded information signal 2a.

Figure 7:
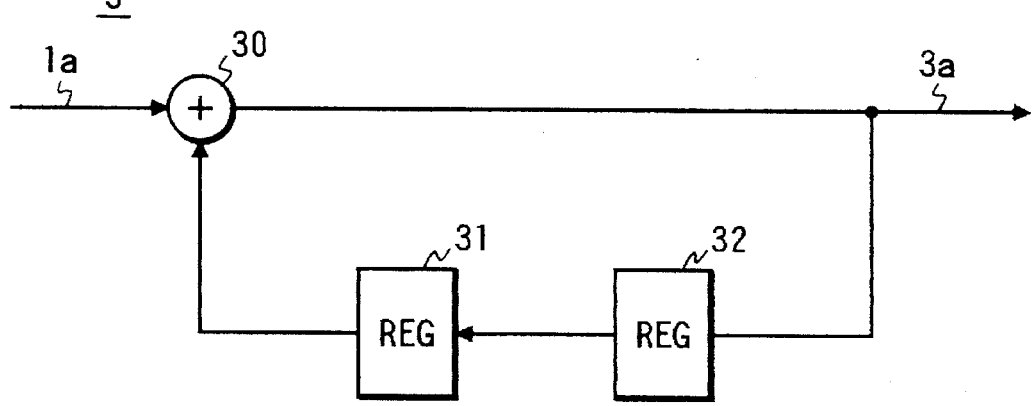
FIG. 7 is a block diagram of a pre-coder in the digital information modulating apparatus of FIG. 6.

A pre-coder 3 receives the information signal 1a from the "0" adding device 1. As shown in FIG. 7, the pre-coder 3 includes adder 30 and registers 31 and 32. A first input terminal of the adder 30 is subjected to the information signal 1a. A second input terminal of the adder 30 is connected to the output terminal of the register 31. The input terminal of the register 31 is connected to the output terminal of the register 32. The input terminal of the register 32 is connected to the output terminal of the adder 30.

In the pre-coder 3 of FIG. 7, the adder 30 combines the information signal 1a and an output signal of the register 31 into a pre-coded information signal 3a. The registers 31 and 32 operate in response to a clock signal having a period corresponding to one bit. The registers 31 and 32 cooperate to delay the pre-coded information signal 3a by a given time corresponding to two bits. The register 31 outputs the delay-resultant information signal to the adder 30.

With reference back to FIG. 6, a delay device 6 receives the pre-coded Information signal 3a from the pre-coder 3. The delay device 6 delays the pre-coded information signal 3a, and thereby converts the pre-coded information signal 3a into a delay-resultant pre-coded information signal 6a for timing adjustment. The delay device 6 outputs the delay-resultant pre-coded information signal 6a to a switch 12.

A pre-coder 7 receives the information signal 2a from the "1" adding device 2. The pre-coder 7 is similar to the pre-coder 3 in structure. The pre-coder 7 encodes the information signal 2a into a pre-coded information signal 7a, and outputs the information signal 7a to a delay device 10. The delay device 10 delays the pre-coded information signal 7a, and thereby converts the pre-coded information signal 7a into a delay-resultant pre-coded information signal 10a for timing adjustment. The delay device 10 outputs the delay-resultant pre-coded information signal 10a to the switch 12.

An error detector 4 receives the pre-coded information signal 3a from the pre-coder 3. The error detector 4 detects the frequency condition (the frequency spectrum) of the pre-coded information signal 3a, and compares the detected frequency condition of the pre-coded information signal 3a with a desired frequency condition (a desired frequency spectrum). The error detector 4 generates an error signal 4a representing the difference (the error) between the detected frequency condition and the desired frequency condition. The error detector 4 outputs the error signal 4a to a data controller 11A.

A run-length detector 5 receives the pre-coded information signal 3a from the pre-coder 3. The run-length detector 5 generates a run-length detection signal 5a from the pre-coded information signal 3a. The run-length detection signal 5a represents the number of successive bits of a same logic state (that is, a run length) in the pre-coded information signal 3a. The run-length detector 5 outputs the run-length detection signal 5a to the data controller 11A.

An error detector 8 receives the pre-coded information signal 7a from the pre-coder 7. The error detector 8 detects the frequency condition (the frequency spectrum) of the pre-coded information signal 7a, and compares the detected frequency condition of the pre-coded information signal 7a with a desired frequency condition (a desired frequency spectrum). The error detector 8 generates an error signal 8a representing the difference (the error) between the detected frequency condition and the desired frequency condition. The error detector 8 outputs the error signal 8a to the data controller 11A.

A run-length detector 9 receives the pre-coded information signal 7a from the pre-coder 7. The run-length detector 9 generates a run-length detection signal 9a from the pre-coded information signal 7a. The run-length detection signal 9a represents the number of successive bits of a same logic state (that is, a run length) in the pre-coded information signal 7a. The run-length detector 9 outputs the run-length detection signal 9a to the data controller 11A.

A sync information detector 13 receives the pre-coded information signal 3a from the pre-coder 3. The sync information detector 13 serves to detect a bit pattern in the pre-coded information signal 3a which is equal to a predetermined sync bit pattern. The sync information detector 13 generates a sync detection signal 13a representing the presence and the absence of a bit pattern in the pre-coded information signal 3a which is equal to the predetermined sync bit pattern. The sync information detector 13 outputs the sync detection signal 13a to the data controller 11A.

A first example of the predetermined sync bit pattern has 17 bits in states as "00000111111111101". A second example of the predetermined sync bit pattern has 17 bits in states as "11111000000000010".

A sync information detector 14 receives the information signal 7a from the pre-coder 7. The sync information detector 14 serves to detect a bit pattern in the pre-coded information signal 7a which is equal to the predetermined sync bit pattern. The sync information detector 14 generates a sync detection signal 14a representing the presence and the absence of a bit pattern in the pre-coded information signal 7a which is equal to the predetermined sync bit pattern. The sync information detector 14 outputs the sync detection signal 14a to the data controller 11A.

The data controller 11A generates a control signal 11a in response to the error signals 4a and 8a, the run-length detection signals 5a and 9a, and the sync detection signals 13a and 14a. The data controller 11A outputs the generated control signal 11a to the switch 12. The switch 12 selects one of the delay-resultant pre-coded information signals 6a and 10a in response to the control signal 11a, and transmits the selected signal as an output information signal or a modulation-resultant information signal "bb".

The data controller 11A includes, for example, a signal processor or a microcomputer programmed to execute the following functions. The sync detection signals 13a and 14a take priority over the error signals 4a and 8a and the run-length detection signals 5a and 9a. In the case where one of the sync detection signals 13a and 14a represents the presence of a bit pattern equal to the predetermined sync bit pattern, the data controller 11A sets the control signal 11a to a state enabling the switch 12 to select one of the delay-resultant pre-coded information signals 6a and 10a which is unrelated to the presence of the bit pattern equal to the predetermined sync bit pattern.

On the other hand, in the case where none of the sync detection signals 13a and 14a represents the presence of a bit pattern equal to the predetermined sync bit pattern, or in the case where both the sync detection signals 13a and 14a represent the presence of bit patterns equal to the predetermined sync bit pattern, the data controller 11A executes further decisions responsive to the error signals 4a and 8a and the run-length detection signals 5a and 9a and controls the state of the control signal 11a in accordance with the results of the further decisions. Specifically, the further decisions include the additional steps as follows. In the case where one of the run lengths represented by the run-length detection signals 5a and 9a exceeds a threshold value, the data controller 11A sets the control signal 11a to a state enabling the switch 12 to select one of the delay-resultant pre-coded information signals 6a and 10a which is unrelated to the excess over the threshold value. In the case where both the run lengths represented by the run-length detection signals 5a and 9a exceed the threshold value and where the run lengths are different from each other, the data controller 11A sets the control signal 11a to a state enabling the switch 12 to select one of the delay-resultant pre-coded information signals 6a and 10a which is related to the smaller run-length. In the case where both the run lengths represented by the run-length detection signals 5a and 9a exceed the threshold value and where the run lengths are equal to each other, the data controller 11A compares the errors represented by the error signals 4a and 8a and sets the control signal 11a to a state enabling the switch 12 to select one of the delay-resultant pre-coded information signals 6a and 10a which is related to the smaller error. In the case where both the run lengths represented by the run-length detection signals 5a and 9a do not exceed the threshold value, the data controller 11A compares the errors represented by the error signals 4a and 8a and sets the control signal 11a to a state enabling the switch 12 to select one of the delay-resultant pre-coded information signals 6a and 10a which is related to the smaller error.

As understood from the previous description, when a bit pattern equal to the predetermined sync bit pattern is accidentally present in one of the pre-coded information signals 3a and 7a, one of the delay-resultant pre-coded information signals 6a and 10a which is unrelated to the presence of the bit pattern equal to the predetermined sync bit pattern is selected as the modulation-resultant information signal "bb". Accordingly, there is a reduced frequency of the occurrence of a bit pattern equal to the predetermined sync bit pattern in the modulation-resultant information signal "bb". If the digital information modulating apparatus of FIG. 6 is incorporated in a digital VTR, the reduced frequency of the occurrence causes a smaller chance that a segment of the reproduced information signal which is not the true sync information signal but which has a bit pattern equal to the predetermined sync bit pattern is recognized as a true sync information signal SYNC during the reproducing process at a tape speed different from the recording tape speed.

Figure 8:
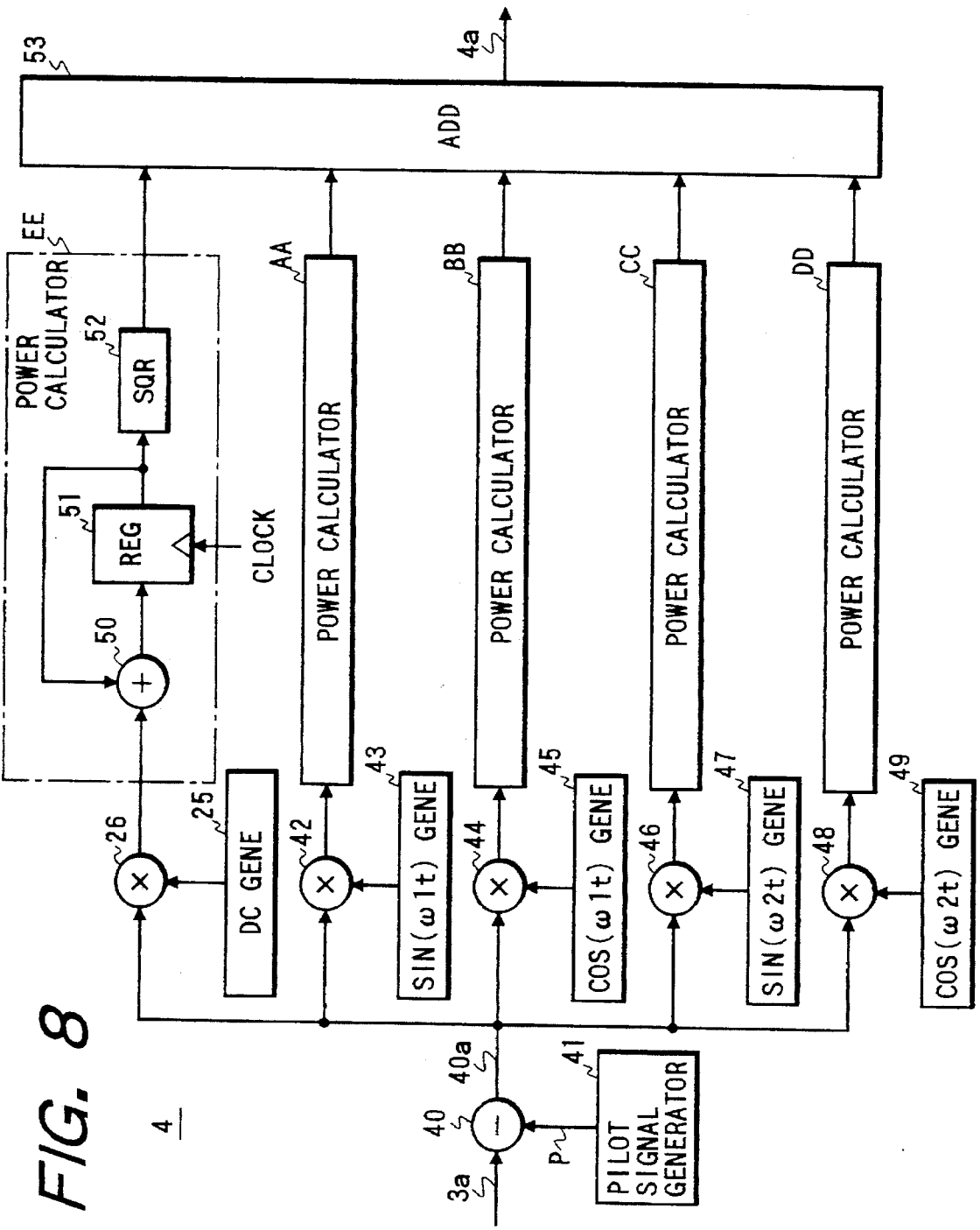
FIG. 8 is a block diagram of an error detector in the digital information modulating apparatus of FIG. 6.

The error detectors 4 and 8 are similar in structure. Only the structure of the error detector 4 will now be described. As shown in FIG. 8, the error detector 4 includes a subtracter 40 and a pilot signal generator 41. The subtracter 40 receives the pre-coded information signal 3a from the pre-coder 3. The pilot signal generator 41 includes, for example, a ROM which generates a composite pilot information signal P corresponding to pilot signals having predetermined frequencies ω1 and ω2. The pilot signal generator 41 outputs the generated pilot information signal P to the subtracter 40. The subtracter 40 subtracts the pilot information signal P from the pre-coded information signal 3a, thereby converting the pre-coded information signal 3a into a pilot-less information signal 40a.

In the error detector 4 of FIG. 8, a signal generator 25 outputs a DC component signal representing a direct-current signal component. A multiplier 26 receives the DC component signal from the signal generator 25 and also receives the pilot-less information signal 40a from the subtracter 40, multiplying the DC component signal and the pilot-less information signal 40a bit by bit and thereby extracting a DC component from the pilot-less information signal 40a.

As shown in FIG. 8, a power calculator EE follows the multiplier 26. The power calculator EE includes an adder 50, a register 51, and a squaring device 52. The adder 50 receives the output signals of the multiplier 26 and the register 51, and adds and combines the received signals into an integral-representing signal bit by bit. The register 51 receives the integral-representing signal from the adder 50, and delays the received signal by a time corresponding to one bit. The register 51 operates in response to a clock signal having a period corresponding to one bit. The register 51 outputs the delay-resultant signal to the adder 50 and the squaring device 52. The squaring device 52 subjects the output signal of the register 51 to a squaring process bit by bit, and thereby generates a signal representing the power of the DC component of the pre-coded information signal 3a. The squaring device 52 outputs the power-representing signal to an adder 53.

In the error detector 4 of FIG. 8, a signal generator 43 outputs a sin(ω1t) component signal representing a signal component having the pilot signal frequency ω1. A multiplier 42 receives the sin(ω1t) component signal from the signal generator 43 and also receives the pilot-less information signal 40a from the subtracter 40, multiplying the sin(ω1t) component signal and the pilot-less information signal 40a bit by bit and thereby extracting a sin(ω1t) component from the pilot-less information signal 40a. A power calculator AA follows the multiplier 42. The power calculator AA is similar to the power calculator EE in structure. The power calculator AA processes the output signal of the multiplier 42 into a signal representing the power of the sin(ω1t) component of the pre-coded information signal 3a. The power calculator AA outputs the power-representing signal to the adder 53.

In the error detector 4 of FIG. 8, a signal generator 45 outputs a cos(ω1t) component signal representing a signal component having the pilot signal frequency ω1. A multiplier 44 receives the cos(ω1t) component signal from the signal generator 45 and also receives the pilot-less information signal 40a from the subtracter 40, multiplying the cos(ω1t) component signal and the pilot-less information signal 40a bit by bit and thereby extracting a cos(ω1t) component from the pilot-less information signal 40a. A power calculator BB follows the multiplier 44. The power calculator BB is similar to the power calculator EE in structure. The power calculator BB processes the output signal of the multiplier 44 into a signal representing the power of the cos(ω1t) component of the pre-coded information signal 3a. The power calculator BB outputs the power-representing signal to the adder 53.

In the error detector 4 of FIG. 8, a signal generator 47 outputs a sin(ω2t) component signal representing a signal component having the pilot signal frequency ω2. A multiplier 46 receives the sin(ω2t) component signal from the signal generator 47 and also receives the pilot-less information signal 40a from the subtracter 40, multiplying the sin(ω2t) component signal and the pilot-less information signal 40a bit by bit and thereby extracting a sin(ω2t) component from the pilot-less information signal 40a. A power calculator CC follows the multiplier 46. The power calculator CC is similar to the power calculator EE in structure. The power calculator CC processes the output signal of the multiplier 46 into a signal representing the power of the sin(ω2t) component of the information signal 3a. The power calculator CC outputs the power-representing signal to the adder 53.

In the error detector 4 of FIG. 8, a signal generator 49 outputs a cos(ω2t) component signal representing a signal component having the pilot signal frequency ω2. A multiplier 48 receives the cos(ω2t) component signal from the signal generator 49 and also receives the pilot-less information signal 40a from the subtracter 40, multiplying the cos(ω2t) component signal and the pilot-less information signal 40a bit by bit and thereby extracting a cos(ω2t) component from the pilot-less information signal 40a. A power calculator DD follows the multiplier 48. The power calculator DD is similar to the power calculator EE in structure. The power calculator DD processes the output signal of the multiplier 48 into a signal representing the power of the cos(ω2t) component of the pre-coded information signal 3a. The power calculator DD outputs the power-representing signal to the adder 53.

The adder 53 adds and combines the output signals of the power calculators AA, BB, CC, DD, and EE into the error signal 4a every 25 bits. The power value Y(t) represented by the error signal 4a is expressed as follows.

$$Y(t) = \left\{ \int_{-\infty}^{t} X(t) \cdot dt \right\}^2 + \left\{ \int_{-\infty}^{t} X(t) \cdot \sin\omega_1 t \cdot dt \right\}^2 + \left\{ \int_{-\infty}^{t} X(t) \cdot \cos\omega_1 t \cdot dt \right\}^2 + \left\{ \int_{-\infty}^{t} X(t) \cdot \sin\omega_2 t \cdot dt \right\}^2 + \left\{ \int_{-\infty}^{t} X(t) \cdot \cos\omega_2 t \cdot dt \right\}^2$$

where X(t) denotes the value represented by the output signal 40a of the subtracter 40. In the right-hand side of the above equation: the first term denotes the power of the DC component of the information signal 40a which is calculated by the power calculator EE; the second term denotes the power of the sin(ω1t) component of the information signal 40a which is calculated by the power calculator AA; the third term denotes the power of the cos(ω1t) component of the information signal 40a which is calculated by the power calculator BB; the fourth term denotes the power of the $\sin(\omega 2t)$ component of the information signal 40a which is calculated by the power calculator CC; and the fifth term denotes the power of the $\cos(\omega 2t)$ component of the information signal 40a which is calculated by the power calculator DD. The power value Y(t) drops in accordance with decreases in the DC component of the information signal 40a and the components of the information signal 40a which have the pilot frequencies $\omega 1$ and $\omega 2$.

Figure 9:
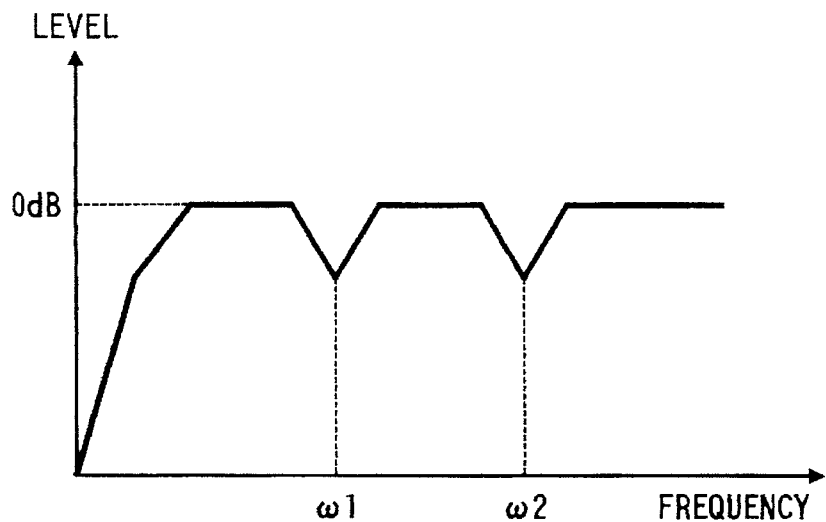
FIG. 9 is a diagram of the frequency spectrum of a modulation-resultant information signal of a first type.
Figure 10:
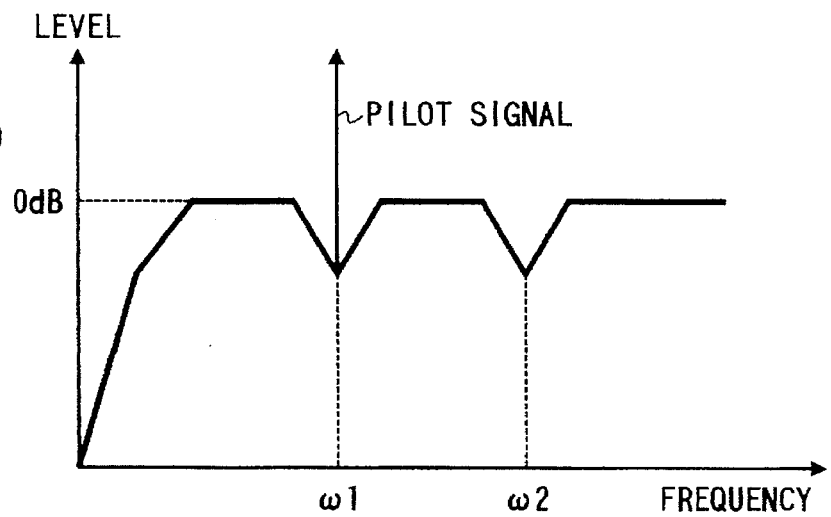
FIG. 10 is a diagram of the frequency spectrum of a modulation-resultant information signal of a second type.
Figure 11:
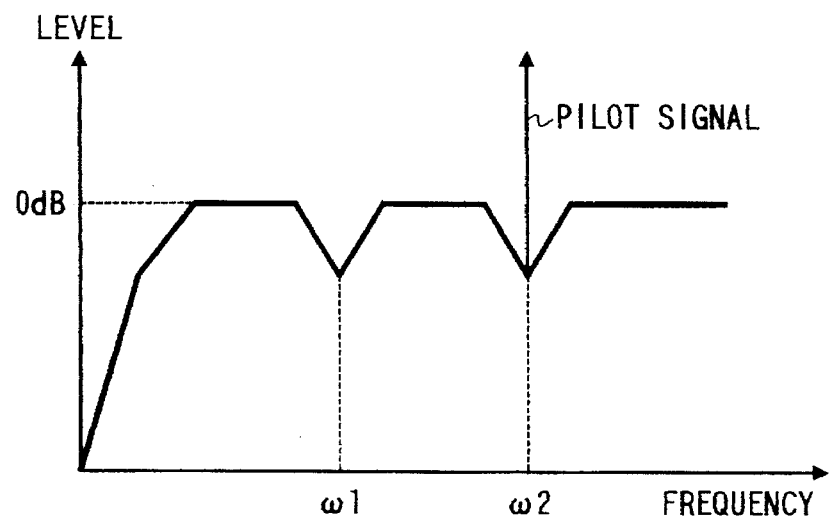
FIG. 11 is a diagram of the frequency spectrum of a modulation-resultant information signal of a third type.

The modulation-resultant information signal "bb" outputted from the digital information modulating apparatus of FIG. 6 is changeable among three different types F0, F1, and F2. FIGS. 9, 10, and 11 show an example of the frequency spectrums of an F0-type modulation-resultant information signal "bb", an F1-type modulation-resultant information signal "bb", and an F2-type modulation-resultant information signal "bb". In each of the F0-type, the F1-type, and the F2-type, DC signal components are remarkably suppressed, and signal components having frequencies around the pilot signal frequencies $\omega 1$ and $\omega 2$ are moderately suppressed to provide notches. As shown in FIG. 9, both the pilot signals having the frequencies $\omega 1$ and $\omega 2$ are absent from the F0-type. As shown in FIG. 10, only the pilot signal having the frequency $\omega 1$ is present in the F1-type. As shown in FIG. 11, only the pilot signal having the frequency $\omega 2$ is present in the F2-type.

Figure 12:
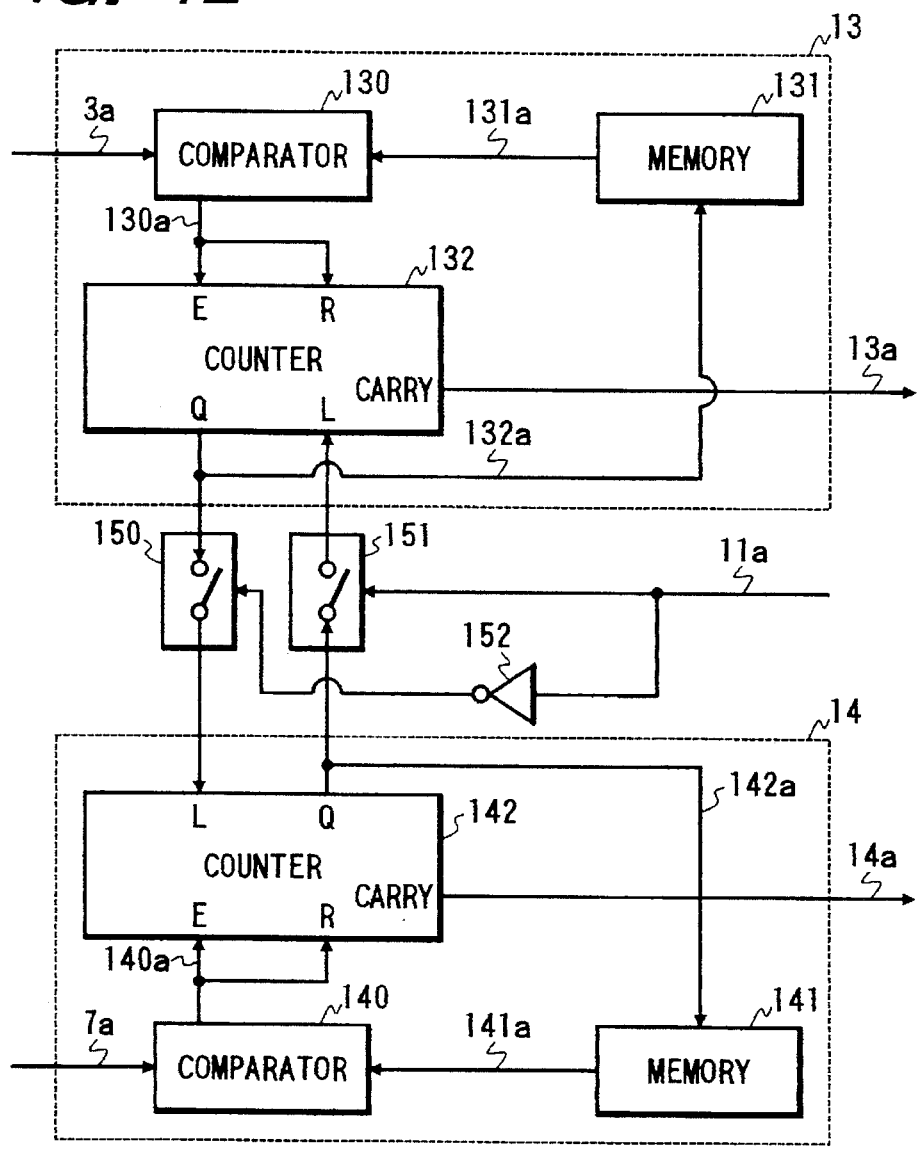
FIG. 12 is a block diagram of sync information detectors and related devices In the digital information modulating apparatus of FIG. 6.

The sync information detectors 13 and 14 will now be described in detail. As shown in FIG. 12, the sync information detector 13 includes a comparator 130, a memory 131, and a counter 132. The comparator 130 receives the pre-coded information signal 3a from the pre-coder 3. The memory 131 stores a signal 131a having the predetermined sync bit pattern. Successive bits of the sync bit pattern signal 131a are sequentially stored in storage segments of the memory 131 which have successive addresses respectively. The memory 131 outputs one bit of the sync bit pattern signal 131a to the comparator 130 in response to an address signal. The comparator 130 compares the pre-coded information signal 3a and the sync bit pattern signal 131a bit by bit. When compared bits of the pre-coded information signal 3a and the sync bit pattern signal 131a are equal in logic state, the comparator 130 generates an agreement signal 130a in a high level state. When compared bits of the pre-coded information signal 3a and the sync bit pattern signal 131a are different in logic state, the comparator 130 generates an agreement signal 130a in a low level state. The comparator 130 outputs the agreement signal 130a to an enabling input terminal and a reset input terminal of the counter 132.

The counter 132 receives a clock signal from a suitable device (not shown). The dock signal has a fixed period corresponding to the 1-bit period of the pre-coded information signal 3a. While the agreement signal 130a remains in the high level state, the counter 132 counts up pulses of the clock signal. When the agreement signal 130a falls into the low level state, the counter 132 resets the counted pulse number. A signal 132a which appears at a data output terminal Q of the counter 132 represents the counted pulse number, that is, the number of successive bits Where the pre-coded information signal 3a and the sync bit pattern signal 131a are equal. The counter 132 feeds the pulse number signal 132a to the memory 131 as an address signal. Each time the counted pulse number increases by one, the address signal is updated so that a bit of the sync bit pattern signal 131a outputted from the memory 131 is replaced by a next bit. When the counter 132 is reset by the agreement signal 130a, the memory 131 restarts the outputting of the sync bit pattern signal 131a from its first bit. When the counted pulse number reaches a given number equal to the total number of bits of the sync bit pattern signal 131a, the counter 132 outputs a carry signal which is used as the sync detection signal 13a fed to the data controller 11A.

As shown in FIG. 12, the sync information detector 14 includes a comparator 140, a memory 141, and a counter 142. The comparator 140 receives the pre-coded information signal 7a from the pre-coder 7. The memory 141 stores a signal 141a having the predetermined sync bit pattern. Successive bits of the sync bit pattern signal 141a are sequentially stored in storage segments of the memory 141 which have successive addresses respectively. The memory 141 outputs one bit of the sync bit pattern signal 141a to the comparator 140 in response to an address signal. The comparator 140 compares the pre-coded information signal 7a and the sync bit pattern signal 141a bit by bit. When compared bits of the pre-coded information signal 7a and the sync bit pattern signal 141a are equal in logic state, the comparator 140 generates an agreement signal 140a in a high level state. When compared bits of the pre-coded information signal 7a and the sync bit pattern signal 141a are different in logic state, the comparator 140 generates an agreement signal 140a in a low level state. The comparator 140 outputs the agreement signal 140a to an enabling input terminal and a reset input terminal of the counter 142.

The counter 142 receives a clock signal from a suitable device (not shown). The clock signal has a fixed period corresponding to the 1-bit period of the pre-coded information signal 7a. While the agreement signal 140a remains in the high level state, the counter 142 counts up pulses of the dock signal. When the agreement signal 140a falls into the low level state, the counter 142 resets the counted pulse number. A signal 142a which appears at a data output terminal Q of the counter 142 represents the counted pulse number, that is, the number of successive bits where the information signal 7a and the sync bit pattern signal 141a are equal. The counter 142 feeds the pulse number signal 142a to the memory 141 as an address signal. Each time the counted pulse number increases by one, the address signal is updated so that a bit of the sync bit pattern signal 141a outputted from the memory 141 is replaced by a next bit. When the counter 142 is reset by the agreement signal 140a, the memory 141 restarts the outputting of the sync bit pattern signal 141a from its first bit. When the counted pulse number reaches a given number equal to the total number of bits of the sync bit pattern signal 141a, the counter 142 outputs a carry signal which is used as the sync detection signal 14a fed to the data controller 11A.

As shown in FIG. 12, the data output terminal Q of the counter 132 in the sync information detector 13 is connected via a switch 150 to a load terminal L of the counter 142 in the sync information detector 14. The data output terminal Q of the counter 142 in the sync information detector 14 is connected via a switch 151 to a load terminal L of the counter 132 in the sync information detector 13. The switch 150 has a control terminal connected to the output terminal of an inverter 152. The input terminal of the inverter 152 is subjected to the control signal 11a outputted from the data controller 11A. The switch 151 has a control terminal subjected to the control signal 11a outputted from the data controller 11A.

When the control signal 11a assumes a state enabling the selection of the delay-resultant pre-coded information signal 6a by the switch 12, the switch 151 is opened by the control signal 11a but the switch 150 is closed by the output signal of the inverter 152 so that the counter 142 in the sync information detector 14 is loaded with the pulse number signal 132a outputted by the counter 132 in the sync information detector 13. On the other hand, when the control signal 11a assumes a state enabling the selection of the delay-resultant pre-coded information signal 10a by the switch 12, the switch 150 is opened by the output signal of the inverter 152 but the switch 151 is closed by the control signal 11a so that the counter 132 in the sync information detector 13 is loaded with the pulse number signal 142a outputted by the counter 142 in the sync information detector 14.

Figure 13:
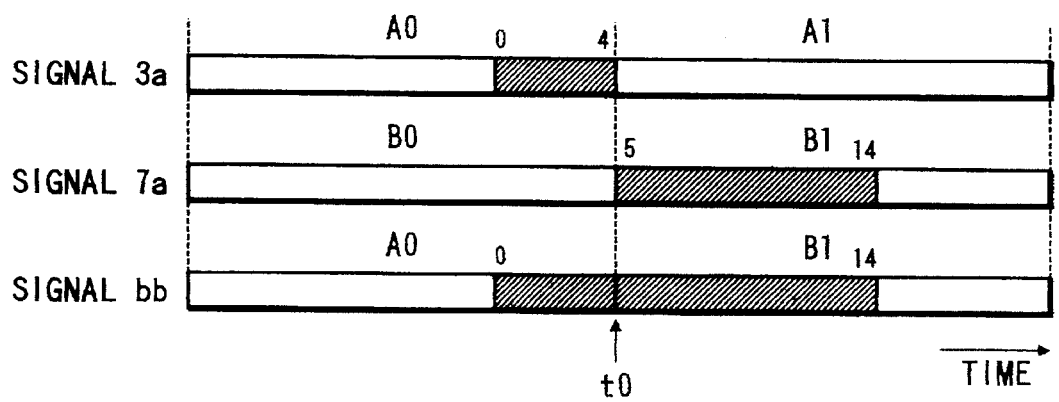
FIG. 13 is a time-domain diagram of one example of information signals in the digital information modulating apparatus of FIG. 6.

It is now assumed that the pre-coded information signals 3a and 7a outputted from the pre-coders 3 and 7 have time-domain conditions as shown in the portions (A) and (B) of FIG. 13 respectively. Specifically, in the portion (A) of FIG. 13, data A0 of the pre-coded information signal 3a is replaced by data A1 thereof at a moment t0, and the 5 last bits of the data A0 agree with the 5 former bits of the predetermined sync bit pattern. In the portion (B) of FIG. 13, data B0 of the information signal 7a is replaced by data B1 thereof at the moment t0, and 12 former bits of the data B1 agree with 12 latter bits of the predetermined sync bit pattern. It is also assumed that selection of one of the delay-resultant pre-coded information signals 6a and 10a will change at a moment corresponding to the moment t0, and the delay-resultant pre-coded information signal 6a relevant to the pre-coded information signal 3a will remain selected during an interval until the moment corresponding to the moment t0 whereas the delay-resultant pre-coded information signal 10a relevant to the pre-coded information signal 7a will start to be selected from the moment corresponding to the moment t0 as shown in the portion (C) of FIG. 13. Even in such a case, loading the counter 142 with the pulse number signal 132a via the switch 150 and loading the counter 132 with the pulse number signal 142a via the switch 151 enable the detection of a bit pattern equal to the predetermined sync bit pattern which extends in both selected portions of the pre-coded information signals 3a and 7a. Accordingly, such a bit pattern equal to the predetermined sync bit pattern is prevented from appearing in the modulation-resultant information signal "bb".

It should be noted that the error detectors 4 and 8 may be omitted. Also, the run-length detectors 5 and 9 may be omitted.

In the case where two different predetermined sync bit patterns are used, the sync information detectors 13 and 14 are assigned to one of the predetermined sync bit patterns while additional sync information detectors are provided for the other predetermined sync bit pattern.

As understood from the previous description, the digital information modulating apparatus of FIG. 6 is divided into two signal systems, one having the "0" adding device 1, the pre-coder 3, and the delay device 6, and the other having the "1" adding device 2, the pre-coder 7, and the delay device 10. The error detectors 4 and 8, the run-length detectors 5 and 9, and the sync information detectors 13 and 14 are separated into two groups which correspond to the two signal systems of the apparatus respectively. It should be noted that the digital information modulating apparatus of FIG. 6 may be modified into a structure divided into three signal systems. In this case, it is preferable to provide an error detector, a run-length detector, and a sync information detector for each of the three signal systems.

What is claimed is:

1. A digital information modulating apparatus comprising:

means for separating a first information signal every m bit or bits;

means for adding n bit or bits to a head of said every m bit or bits to change said every m bit or bits of the first information signal into m+n bits to derive a plurality of sequences of a second information signal where "m" and "n" denote predetermined natural numbers;

means for precoding the second information signal into plural pre-coded information signals in accordance with combinations of the added n bit or bits;

means for detecting whether or not predetermined sync information is present in the pre-coded information signals, and generating a sync detection signal representative thereof; and means for selecting one of the pre-coded information signals as a modulation-resultant output signal in response to the sync detection signal.

2. A digital information modulating apparatus comprising:

means for separating a first information signal every m bit or bits;

means for adding n bit or bits to a head of said every m bit or bits to change said every m bit or bits of the first information signal into m+n bits to derive a plurality of sequences of a second information signal where "m" and "n" denote predetermined natural numbers;

means for pre-coding the second information signal into plural pre-coded information signals in accordance with combinations of the added n bit or bits;

means for detecting whether or not predetermined sync information is present in the pre-coded information signals, and generating a sync detection signal representative thereof;

means for detecting errors between frequency conditions of the pre-coded information signals and a predetermined frequency condition, and generating an error signal representative thereof; and means for selecting one of the pre-coded information signals as a modulation-resultant output signal in response to the sync detection signal and the error signal.

3. A digital information modulating apparatus comprising:

means for periodically adding a bit in a logic state of "0" to a first bit sequence to convert the first bit sequence into a second bit sequence, the first bit sequence representing information to be subjected to modulation;

means for periodically adding a bit in a logic state of "1" to the first bit sequence to convert the first bit sequence into a third bit sequence;

means for converting the second bit sequence into a fourth bit sequence;

means for converting the third bit sequence into a fifth bit sequence;

means for detecting whether or not successive bits having a predetermined sync bit pattern is present in the fourth bit sequence, and generating a first detection signal representative thereof;

means for detecting whether or not successive bits having the predetermined sync bit pattern is present in the fifth bit sequence, and generating a second detection signal representative thereof; and means for selecting one of the fourth bit sequence and the fifth bit sequence as a modulation-resultant bit sequence In response to the first and second detection signals to prevent the modulation-resultant bit sequence from containing successive bits having the predetermined sync bit pattern.

\* \* \* \* \*